US010471616B2

(12) United States Patent
Chen et al.

(10) Patent No.: US 10,471,616 B2
(45) Date of Patent: Nov. 12, 2019

(54) CUTTING DEVICE FOR CUTTING OF A ROUND

(71) Applicant: National Taiwan Normal University, Taipei (TW)

(72) Inventors: Jung-Hsuan Chen, Taipei (TW); Chin-Guo Kuo, Taipei (TW); Chao-Fu Shu, Taipei (TW)

(73) Assignee: NATIONAL TAIWAN NORMAL UNIVERSITY, Taipei (TW)

(*) Notice: Subject to any disclaimer, the term of this patent is extended or adjusted under 35 U.S.C. 154(b) by 0 days.

(21) Appl. No.: 15/699,342

(22) Filed: Sep. 8, 2017

(65) Prior Publication Data

US 2019/0001514 A1 Jan. 3, 2019

(30) Foreign Application Priority Data

Jul. 3, 2017 (TW) ............................ 106122289 A

(51) Int. Cl.

| | |
|---|---|
| ***B26B 3/00*** | (2006.01) |
| ***A47J 43/28*** | (2006.01) |
| ***B43L 11/00*** | (2006.01) |
| ***B43L 9/04*** | (2006.01) |
| ***B43L 9/00*** | (2006.01) |
| ***B43L 13/02*** | (2006.01) |
| ***B26D 1/28*** | (2006.01) |
| ***B43L 9/02*** | (2006.01) |
| ***B26B 27/00*** | (2006.01) |

(52) U.S. Cl.
CPC .............. *B26D 1/285* (2013.01); *B26B 27/00* (2013.01); *B43L 9/02* (2013.01)

(58) Field of Classification Search
CPC ............ B26D 1/285; B26B 27/00; B43L 9/02
USPC ....... 30/372, 310; 33/27.01-27.031, 41.1, 42
See application file for complete search history.

(56) References Cited

U.S. PATENT DOCUMENTS 1,282,020 A * 10/1918 Anderson ................. B43L 9/04 33/27.03
1,979,202 A * 10/1934 McBride .................. B25H 7/04 33/42
2,039,584 A * 5/1936 Dixon .................. B43L 11/055 33/31
2,471,193 A * 5/1949 Brower ..................... B43L 9/04 33/27.03

(Continued)

*Primary Examiner* — Evan H MacFarlane
*Assistant Examiner* — Bharat C Patel
(74) *Attorney, Agent, or Firm* — Muncy, Geissler, Olds & Lowe, P.C.

(57) ABSTRACT

In a cutting device for cutting a round, a transparent substrate is arranged on an object to be cut. A sleeving tube is arranged on the transparent substrate. An end of a transverse rod penetrates through the sleeving rod and extends to over the object. The position of the transverse rod in the sleeving rod is adjusted by a locking member. The other end of the transverse rod is fixed to a cutting assembly. The cutting assembly selectively touches the object. A rotating assembly is combined with the transparent substrate and penetrates through the transparent substrate. When the rotating assembly is pressed to touch the object and the rotating assembly rotates on the object to rotate the transparent substrate, the transverse rod moves the cutting assembly to perform a round-cutting operation on the object or paint a round line on the object.

10 Claims, 6 Drawing Sheets

(56) References Cited

U.S. PATENT DOCUMENTS

| | | | | | |
|---|---|---|---|---|---|
| 2,512,786 | A * | 6/1950 | Borg | B43L 11/00 | 101/128.4 |
| 3,430,347 | A * | 3/1969 | Minniear | B43L 9/04 | 33/27.03 |
| 3,996,827 | A * | 12/1976 | Logan | B26F 1/3853 | 83/455 |
| 4,339,877 | A * | 7/1982 | Pierce | B26B 5/005 | 30/293 |
| 4,624,057 | A * | 11/1986 | Hursey | B43L 9/002 | 33/27.01 |
| 4,656,744 | A * | 4/1987 | Decker | B25H 7/04 | 33/41.5 |
| 4,858,322 | A * | 8/1989 | Kluga | B26B 27/00 | 30/310 |
| 4,976,037 | A * | 12/1990 | Hines | B26B 11/00 | 33/27.03 |
| 5,014,436 | A * | 5/1991 | Kozyrski | B26F 1/3846 | 225/96 |
| 5,037,224 | A * | 8/1991 | Wright | B43K 23/04 | 15/437 |
| 5,050,306 | A * | 9/1991 | Renaud | B26B 5/005 | 30/293 |
| 5,079,843 | A * | 1/1992 | Shelton | A61B 17/32053 | 30/300 |
| 5,233,748 | A * | 8/1993 | Logan | B26B 5/005 | 30/293 |
| 5,430,946 | A * | 7/1995 | Peters | B43L 11/055 | 30/310 |
| 5,515,611 | A * | 5/1996 | Maldonado | B23Q 9/0021 | 144/371 |
| 5,878,639 | A * | 3/1999 | Martinez | B26F 1/3846 | 83/13 |
| 6,158,133 | A * | 12/2000 | Carlson | B26B 29/06 | 30/300 |
| 6,754,970 | B2 * | 6/2004 | Daniels | A63B 60/42 | 33/508 |
| 6,889,440 | B2 * | 5/2005 | Okada | B43L 9/04 | 33/18.1 |
| 6,981,328 | B2 * | 1/2006 | Solum | B43L 9/02 | 33/27.02 |
| 7,010,861 | B2 * | 3/2006 | Nicholson | B43L 9/00 | 33/27.03 |
| 7,685,719 | B2 * | 3/2010 | Hogan | B26F 1/3846 | 30/310 |
| 7,823,294 | B2 * | 11/2010 | Contreras | B43L 9/007 | 33/27.03 |
| 8,371,031 | B2 * | 2/2013 | Davies | B26B 5/00 | 30/289 |
| 8,677,641 | B2 * | 3/2014 | Panno, Jr. | B44D 3/00 | 33/483 |
| 8,806,766 | B1 * | 8/2014 | Lee | B25H 7/04 | 33/27.02 |
| 9,308,771 | B2 * | 4/2016 | Ghorbanloo | B43L 9/04 | |
| 9,533,430 | B1 * | 1/2017 | Kalb | B28D 1/30 | |
| 9,592,622 | B2 * | 3/2017 | Bagley | B26F 1/3846 | |
| 2003/0182811 | A1 * | 10/2003 | Hairapetian | B43L 9/04 | 33/27.032 |
| 2011/0214299 | A1 * | 9/2011 | Heh | B26B 27/00 | 30/310 |

* cited by examiner

CUTTING DEVICE FOR CUTTING OF A ROUND

This application claims priority for Taiwan patent application No. 106122289 filed on Jul. 3, 2017, the content of which is incorporated by reference in its entirety.

BACKGROUND OF THE INVENTION

Field of the Invention

The present invention relates to a cutting device, and more particularly to a cutting device for the cutting of a round.

Description of the Related Art

Nowadays, many techniques such as architecture or decoration often cut objects into different topic shapes required. Sometimes, cutting wood boards, plastic boards, Styrofoam boards or cardboards is extensively applied to techniques. More commonly, an object is cut into a square on a wood desk. In the past, a user manually and carefully cut an object into a special shape, such as an arc or a round. Presently, many cutting tools for the cutting of a round or an oval are provided to users for conveniently cutting objects.

As a result, many tools for the cutting of shapes have been produced, such as round cutters, compasses and auxiliary devices for the cutting of a round. They can perform the cutting operation to substitute for an operation that users use their experience and hands to cut objects. These cutting tools can cut objects into shapes required by users, but bring much inconvenience when in use. For example, cutting plastic boards or wood boards is easier than cutting soft material, such as papers or Styrofoam. In other words, the operation of cutting soft material is not easy. For instance, when force is not easily applied on soft material, the correct shape is difficulty formed. Besides, when the soft material is cut into a round or an arc but not effectively pressed down, a round having an unfilled corner or an incomplete round is formed. In addition, the cutting of a round causes difficulty in size adjustment. The size of the round cannot be adjusted according to preferences of users, which is very inconvenient for use in space and seriously affects the cutting efficiency for application.

To overcome the abovementioned problems, the present invention provides a cutting device for cutting a round, so as to improve a cutting way used by users and the cutting efficiency for application.

SUMMARY OF THE INVENTION

A primary objective of the present invention is to provide a cutting device for cutting a round, which uses a rotating assembly to touch an object to be cut when the cutting device is arranged on the object. Then, being the center of a circle, the rotating assembly rotates to move a cutting assembly to easily perform a round-cutting operation on the object.

Another objective of the present invention is to provide a cutting device for cutting a round, wherein the position of a transverse rod used as a rotation radius is adjusted by a locking member, and the length of the transverse rod is adjusted according to requirement of users to form rounds with different radiuses.

Further objective of the present invention is to provide a cutting device for cutting a round, which easily cuts an object such as a cardboard, a wood board, a plastic board or a styrofoam board into a round.

To achieve the abovementioned objectives, the present invention provides a cutting device for cutting a round, which comprises a transparent substrate, a sleeving tube, a transverse rod, a cutting assembly and a rotating assembly. The transparent substrate is arranged on an object to be cut. The sleeving tube is arranged on the transparent substrate. The transverse rod has a first end and a second end and extends to over the object, and the first end of the transverse rod penetrates through the sleeving tube, and a position of the transverse rod in the sleeving tube is adjusted by a locking member. The cutting assembly is fixed to the second end of the transverse rod and selectively touching the object. The rotating assembly is combined with the transparent substrate and penetrates through the transparent substrate. When the rotating assembly is pressed to touch the object and the rotating assembly rotates on the object to rotate the transparent substrate, the transverse rod moves the cutting assembly to perform a round-cutting operation on the object or paint a round line on the object.

In an embodiment of the present invention, the cutting assembly further comprises a base and a sliding-ball rod. The base is penetrated with a cutting member and a painting member, and the base adjusts lengths of the cutting member and the painting member within the base, the cutting member and the painting member are respectively vertical to the object and touch the object, and the cutting member performs the round-cutting operation on the object, and the painting member paints the round line on the object. The sliding-ball rod is fixed to the base and the second end of the transverse rod and arranged between the base and the second end of the transverse rod, and the bottom of the sliding-ball rod has a ball which touches a surface of the object. When the base rotates with the transverse rod, the base rotates the sliding-ball rod to roll the ball on the surface of the object, and the sliding-ball rod supports the cutting member and the painting member. The cutting member is a knife and the painting member is a painting brush.

In an embodiment of the present invention, a side of the base not fixed to the sliding-ball rod has a recess, and the recess is provided with the cutting member therein.

In an embodiment of the present invention, the rotating assembly further comprises an axle seat and an axle ring. The axle seat is combined with the transparent substrate and penetrates through the transparent substrate, and the bottom of the axle seat is higher than the bottom of the transparent substrate, and the top of the axle seat is higher than the top of the transparent substrate. When the axle seat is pressed to apply pressure to the object, the bottom of axle seat touches the surface of the object. The axle ring is arranged on the top of the axle seat and fixed to the axle seat. After the axle seat is pressed, the axle ring rotates the transparent substrate through the axle seat. The bottom of the axle seat is further provided with a cross mark being a rotating center of the transverse rod and the cutting assembly.

In an embodiment of the present invention, the transverse rod further comprises a first tube, a second tube and a length-adjusting member. The first tube penetrates through the sleeving tube. The second tube is fixed to the cutting assembly. An end of the length-adjusting member is connected to the first tube and the other end of the length-adjusting member is connected to the second tube, and the length-adjusting member connects the first tube with the second tube and adjusts a length between the first tube and the second tube.

In an embodiment of the present invention, the locking member is a screw, and the transparent substrate is a transparent plastic substrate, and the rotating assembly is a transparent rotating assembly, and the object is a cardboard or a styrofoam board.

Below, the embodiments are described in detail in cooperation with the drawings to make easily understood the technical contents, characteristics and accomplishments of the present invention.

DETAILED DESCRIPTION OF THE INVENTION

In order to make cutting techniques more convenient, the cutting device of the present invention is a tool having the cutting efficiency for application and easily used by users, replaces the conventional cutting tool for the cutting of a round and cuts various objects to be cut.

Figure 1:
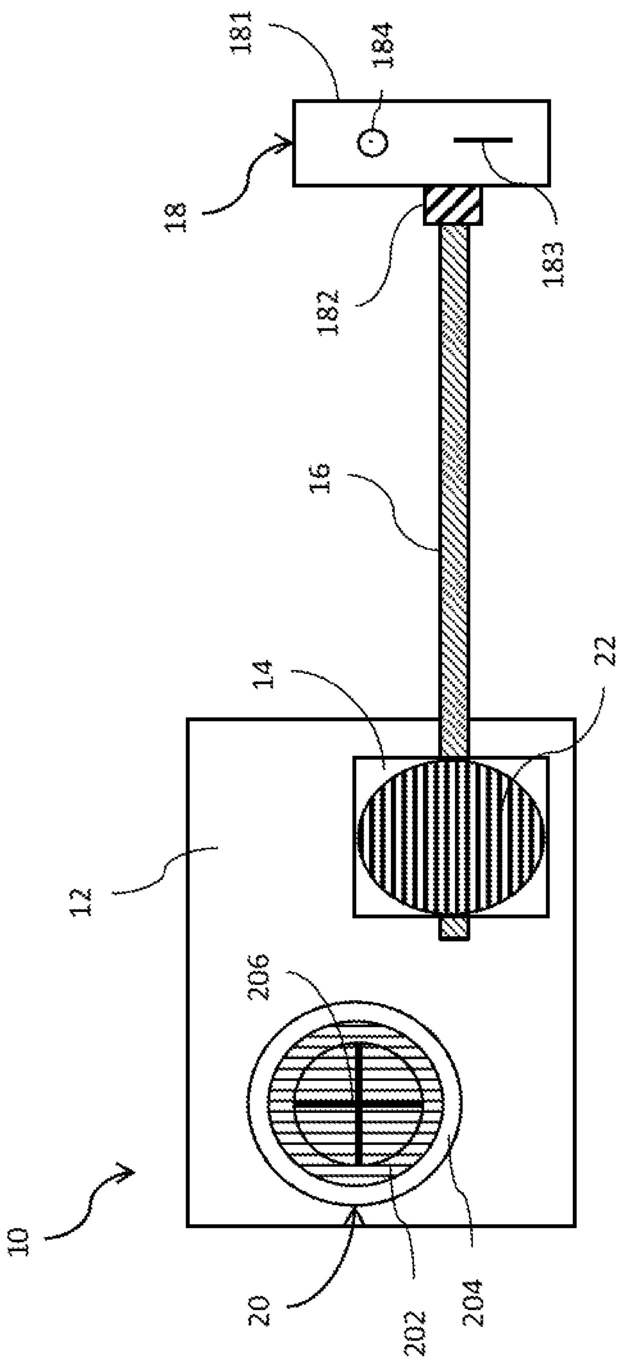
FIG. 1 is a top view of a cutting device according to an embodiment of the present invention.
Figure 2:
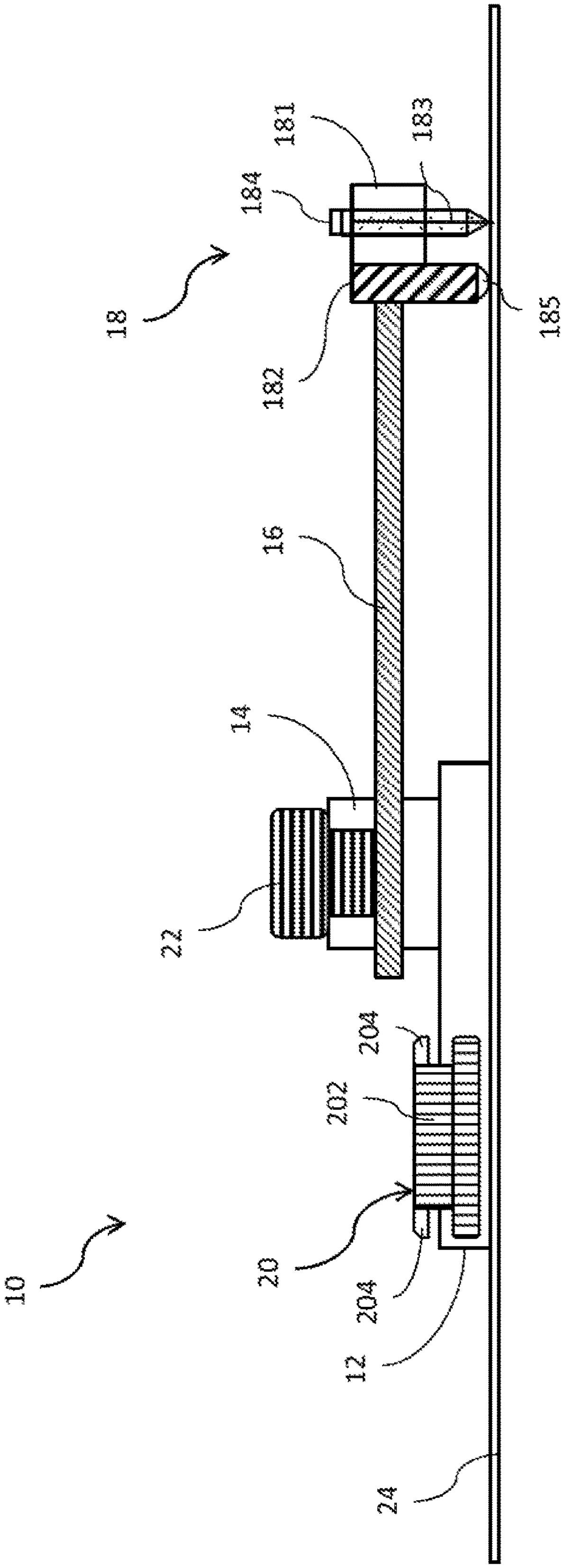
FIG. 2 is a diagram schematically showing a cutting device arranged on an object to be cut according to an embodiment of the present invention.

Firstly, refer to FIG. 1 and FIG. 2. The cutting device 10 for the cutting of a round comprises a transparent substrate 12, a sleeving tube 14, a transverse rod 16, a cutting assembly 18 and a rotating assembly 20. The sleeving tube 14 is arranged on the transparent substrate 12. The transverse rod 16 has a first end and a second end, and the first end of the transverse rod 16 penetrates through the sleeving tube 14 and is fixed in the sleeving tube 14 by a locking member 22. The cutting assembly 18 is fixed to the second end of the transverse rod 16. The rotating assembly 20 is combined with the transparent substrate 12 and penetrates through the transparent substrate 12. The rotating assembly 20 is pressed down to change its position within the transparent substrate 12. In the embodiment, the locking member 22, the transparent substrate 12 and the rotating assembly 20 are respectively a screw, a transparent plastic substrate and a transparent rotating assembly, but the present invention is not limited thereto.

Figure 3:
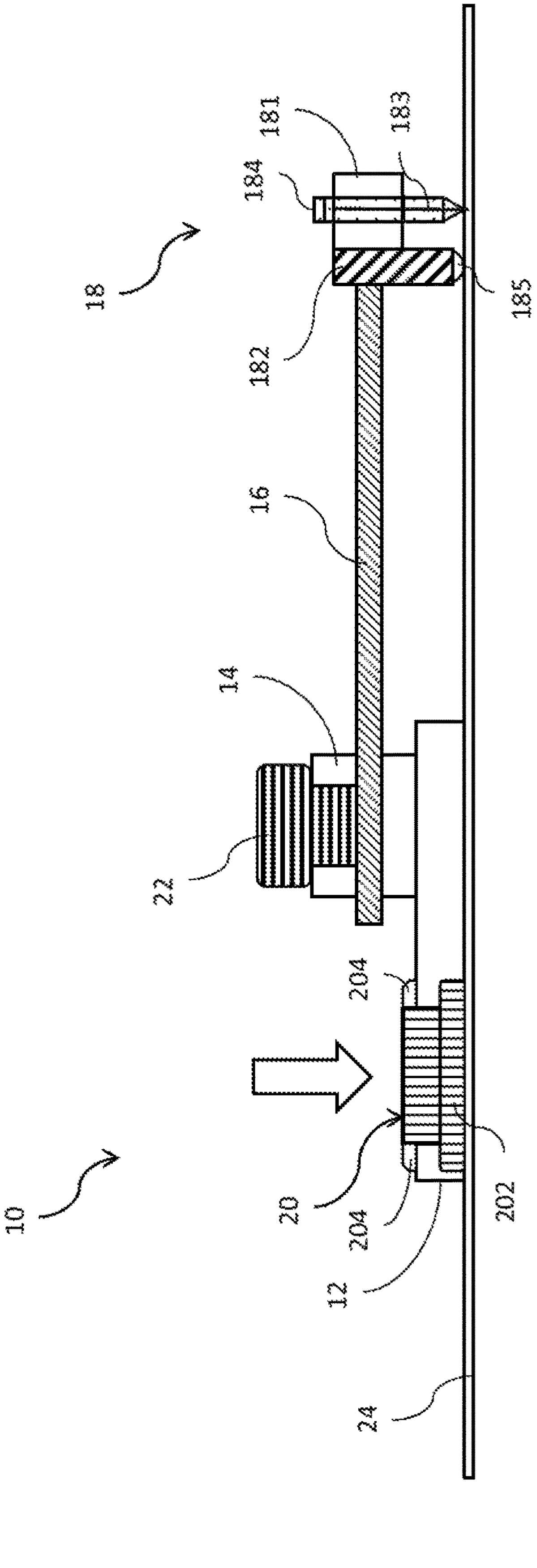
FIG. 3 is a diagram schematically showing a cutting device after pressing a rotating assembly according to an embodiment of the present invention.

Continuing from the abovementioned paragraph, the present invention describes the cutting assembly 18 and the rotating assembly 20 in detail. The cutting assembly 18 comprises a base 181 and a sliding-ball rod 182. The base 181 is selectively penetrated with a cutting member 183 and a painting member 184. In the embodiment, the cutting member 183 and the painting member 184 are respectively a knife and a painting brush. The bottom of the sliding-ball rod 182 has a ball 185. The sliding-ball rod 182 is fixed to the base 181 and the second end of the transverse rod 16 and arranged between the base 181 and the second end of the transverse rod 16. The rotating assembly 20 further comprises an axle seat 202 and an axle ring 204. The axle seat 202 is combined with the transparent substrate 12 and penetrates through the transparent substrate 12. The bottom of the axle seat 202 is higher than the bottom of the transparent substrate 12, and the top of the axle seat 202 is higher than the top of the transparent substrate 12. The axle ring 204 is arranged on the top of the axle seat 202 and over the top surface of the transparent substrate 12 and fixed to the axle seat 202. Refer to FIG. 3. After the rotating assembly 20 is pressed down, the tops of the axle seat 202 and the transparent substrate 12 are coplanar, and the bottoms of the axle seat 202 and the transparent substrate 12 are coplanar. Besides, the axle ring 204 on the axle seat 202 is fixed to the top of the transparent substrate 12. In the embodiment, the bottom of the axle seat 202 is provided with a cross mark 206 being a rotating center.

After describing the structure and the connecting relationship of the cutting device of the present invention, the cutting way of the present invention is described. Refer to FIG. 1 and FIG. 2. A user can use the cutting device 10 to cut an object 24 to be cut, such as a cardboard or a styrofoam board being an object difficulty to be cut. The cutting device 10 of the present invention also can cut a wood board or a plastic board. Firstly, the user places the transparent substrate 12 on the object 24, and the cross mark 206 of the axle seat 202 is used as the center of a circle. The transverse rod 16 extends from the sleeving tube 14 to over the object 24. The sliding-ball rod 182 connected with the transverse rod 16 also touches a surface of the object 24 through the ball 185. The cutting member 183 and the painting member 184 penetrating through the base 181 are respectively vertical to the object 24 and touch the object 24. The base 181 adjusts lengths of the cutting member 183 and the painting member 184 within the base 181. For example, the base 181 is provided with two holes (not shown), and the cutting member 183 and the painting member 184 are respectively inserted into the holes. Then, the lengths of the cutting member 183 and the painting member 184 are adjusted according to requirement of users. Refer to FIG. 3. The user can press down the rotating assembly 20, whereby the bottom of the axle seat 202 is pressed to apply pressure to the object 24. When the axle seat 202 is completely pressed, the bottom of axle seat 202 touches the surface of the object 24. Meanwhile, the height of the axle seat 202 is equal to that of the transparent substrate 12, and the axle seat 202 and the axle ring 204 of the rotating assembly 20 are completely fixed to the transparent substrate 12.

Figure 4:
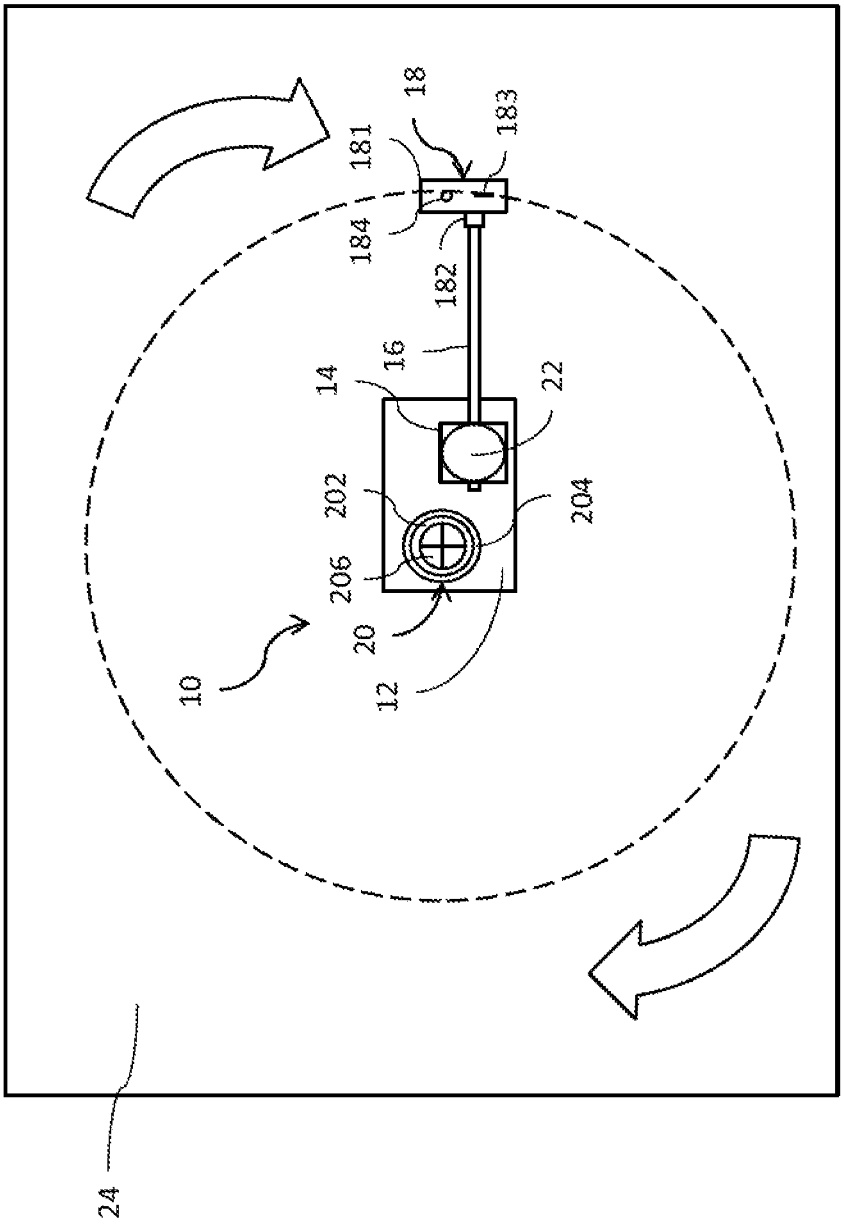
FIG. 4 is a diagram schematically showing a cutting device performing a round-cutting operation according to an embodiment of the present invention.

Refer to FIG. 4. Continuing from the abovementioned paragraph, the user can adjust the axle ring 204 of the rotating assembly 20 after the cutting device 10 is fixed on the object 24. The axle ring 204 is used as the center of a circle to rotate, whereby the axle seat 202 rotates the transparent substrate 12, and the transverse rod 16 on the transparent substrate 12 rotates the cutting assembly 18. As long as the user slightly rotates the axle ring 204, the cutting assembly 18 is moved. The sliding-ball rod 182 of the cutting assembly 18 rolls the ball 185 on the surface of the object and supports the cutting member 183 and the painting member 184 of the cutting assembly 18. Due to the rotating operation, the cutting member 183 cuts the object 24. When rotating by one circle, the cutting member 183 performs a round-cutting operation on the object 24. By the same token, the painting member 184 also paints a round line on the object 24.

Figure 5:
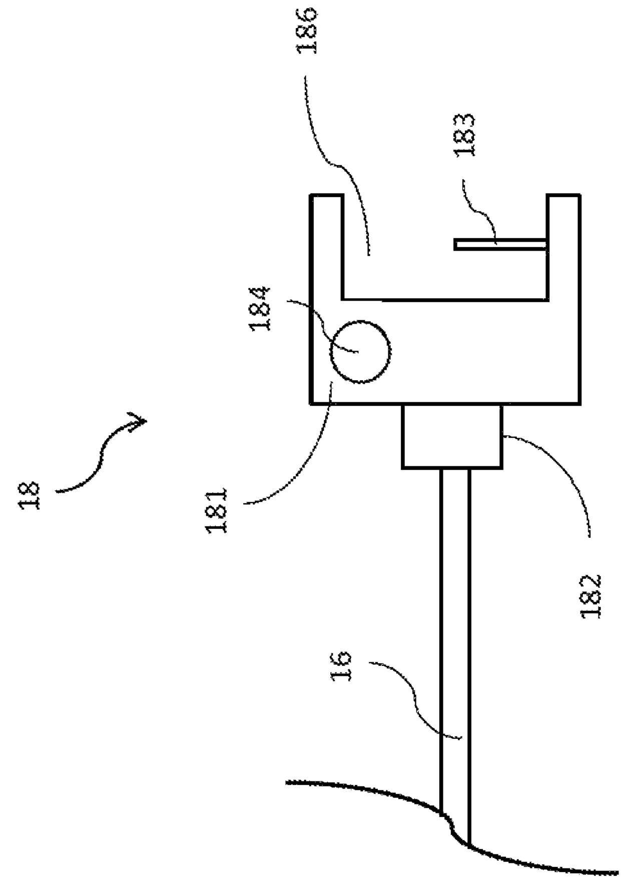
FIG. 5 is a diagram schematically showing a cutting assembly according to an embodiment of the present invention.

The abovementioned embodiment operates in the best cutting way. The present invention does not limit a condition of whether to simultaneously perform the round-cutting operation and paint the round line. The user himself/herself can adjust the lengths of the cutting member and the painting member. For example, a circle is firstly painted. Afterward, a cutting operation is performed. The present invention does not limit how to use the cutting device. Refer to FIG. 5. In addition to the abovementioned structure, a side of the base 18 of the cutting assembly 181 not fixed to the sliding-ball rod 182 has a recess 186. The recess 186 is provided with the cutting member 183 therein. During the cutting operation, the cutting member 183 is embedded in the recess 186. The rotating operation of the cutting member 183 has been described in the abovementioned embodiment. The rotating assembly is pressed down, and then the axle ring is rotated to rotate the transparent substrate and the transverse rod 16, so that the cutting member 183 moves along a circular path to perform the round-cutting operation.

Figure 6:
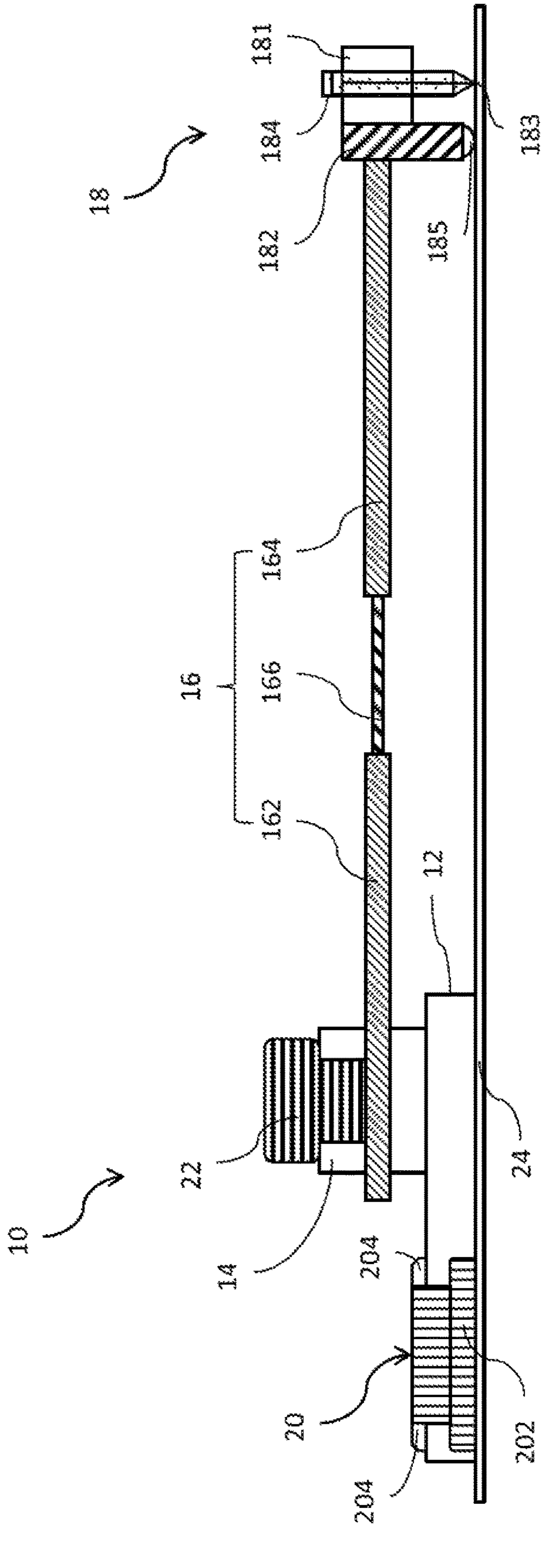
FIG. 6 is a diagram schematically showing a cutting assembly having another transverse rod according to an embodiment of the present invention.

In the abovementioned embodiment, the transverse rod is fixed in the sleeving tube by the locking member. The user can adjust the length of the transverse rod according to requirement. However, the adjustment is limited by the length of the transverse rod. Refer to FIG. 6. The transverse rod 16 comprises a first tube 162, a second tube 164 and a length-adjusting member 166. For example, the length-adjusting member 166 is a slide. The first tube 162 penetrates through the sleeving tube 14 and is locked by the locking member. The second tube 164 is fixed to the cutting assembly 18. An end of the length-adjusting member 166 of connected to the first tube 162 and the other end of the length-adjusting member 166 is connected to the second tube 164. The length-adjusting member 166 connects the first tube 162 with the second tube 164 and adjusts a length between the first tube 162 and the second tube 164. The connecting way of the embodiment is a screwing way. The length-adjusting member 166 is screwed into the first tube 162 and the second tube 164. The present invention does not limit the connecting way. The user adjusts the length screwed into the first tube 162 and the second tube 164 according to requirement, so as to adjust the length of the transverse rod 16. Alternatively, the user replaces the length-adjusting member 166 to satisfy requirement for cutting size. In other words, the user can adjust the length of the transverse rod 16 within the sleeving tube 14. When the length of the transverse rod 16 within the sleeving tube 14 reaches a limit, the length-adjusting member 166 is used to perform a round-cutting operation for a larger area.

It is convenient for the user to use the cutting device for the cutting of the round of the present invention to paint a round and perform a round-cutting operation. The user can place the cutting device on an object to be cut at will. The user does not worry about whether the object is too soft since the cutting device can be entirely and easily placed on the object due to the pressing motion. Without fixing the other positions of the cutting device, the user rotates the cutting device with the pressing point being a rotating center, so as to paint a round line or perform a round-cutting operation. The area of the transparent substrate effectively touches the surface of the object. The user presses and rotates the rotating assembly at the rotating center without applying force on the other positions of the cutting device, whereby the other positions of the object are not depressed or damaged to cause an incomplete cutting problem during the cutting operation. On top of that, the sliding-ball rod can fix the cutting assembly so that the cutting assembly does not rotate askew. In a ball-rolling way, the cutting assembly rotates more conveniently. The user does not worry about a problem with cutting size. The present invention not only adjusts the position of the transverse rod in the sleeving tube but also changes the length of the transverse rod to form rounds with various sizes.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A cutting device for the cutting of a round comprising:
- a transparent substrate arranged on an object to be cut;
- a sleeving tube arranged on said transparent substrate;
- a transverse rod having a first end and a second end and extending to over said object, and said first end of said transverse rod penetrates through said sleeving tube, and a position of said transverse rod in said sleeving tube is adjusted by a locking member;
- a cutting assembly comprising a base and a sliding-ball rod, the base including a cutting member and a bottom of said sliding-ball rod including a ball which touches a surface of said object, wherein the sliding-ball rod is parallel to the cutting member, the sliding-ball rod fixed to said second end of said transverse rod and arranged between said base and said second end of said transverse rod; and
- a rotating assembly combined with said transparent substrate and penetrating through said transparent substrate, the rotating assembly and the sleeving tube arranged on the transparent substrate, the rotating assembly and the sleeving tube having spaced-apart vertical axes, and when said rotating assembly is pressed to touch said object and said rotating assembly rotates on said object to rotate said transparent substrate, said transverse rod moves said cutting assembly to perform a round-cutting operation on said object;
- wherein when said base rotates with said transverse rod, said base rotates said sliding-ball rod to roll said ball on said surface of said object, and said sliding-ball rod supports said cutting member.

2. The cutting device for the cutting of the round according to claim 1, wherein the base penetrated with said cutting member and a painting member, and said base adjusts lengths of said cutting member and said painting member within said base, said cutting member and said painting member are respectively vertical to said object and touch said object, and said cutting member performs said round-cutting operation on said object, and said painting member paints a round line on said object.

3. The cutting device for the cutting of the round according to claim 1, wherein said cutting member is a knife and said painting member is a painting brush.

4. The cutting device for the cutting of the round according to claim 1, wherein a side of said base not fixed to said sliding-ball rod has a recess, and said recess is provided with said cutting member therein.

5. The cutting device for the cutting of the round according to claim 1, wherein said rotating assembly further comprises:
- an axle seat combined with said transparent substrate and penetrating through said transparent substrate, and a bottom of said axle seat is higher than a bottom of said transparent substrate, and a top of said axle seat is higher than a top of said transparent substrate, and when said axle seat is pressed to apply pressure to said object, said bottom of axle seat touches said surface of said object; and an axle ring arranged on said top of said axle seat and fixed to said axle seat, and after said axle seat is pressed, said axle ring rotates said transparent substrate through said axle seat.

6. The cutting device for the cutting of the round according to claim 5, wherein said bottom of said axle seat is further provided with a cross mark being a rotating center of said transverse rod and said cutting assembly.

7. The cutting device for the cutting of the round according to claim 1, wherein said transverse rod further comprises:

a first tube penetrating through said sleeving tube;

a second tube fixed to said cutting assembly; and a length-adjusting member with an end thereof connected to said first tube and another end of said length-adjusting member is connected to said second tube, and said length-adjusting member connects said first tube with said second tube and adjusts a length between said first tube and said second tube.

8. The cutting device for the cutting of the round according to claim 1, wherein said locking member is a screw.

9. The cutting device for the cutting of the round according to claim 1, wherein said transparent substrate is a transparent plastic substrate.

10. The cutting device for the cutting of the round according to claim 1, wherein said rotating assembly is a transparent rotating assembly.

* * * * *